Dec. 28, 1954     H. G. LUTHER     2,698,004
PIGLET FEEDING DEVICE

Filed Aug. 2, 1952     4 Sheets-Sheet 1

Inventor
H. G. LUTHER
Arthur G. Connolly
Attorney

Figure 2:
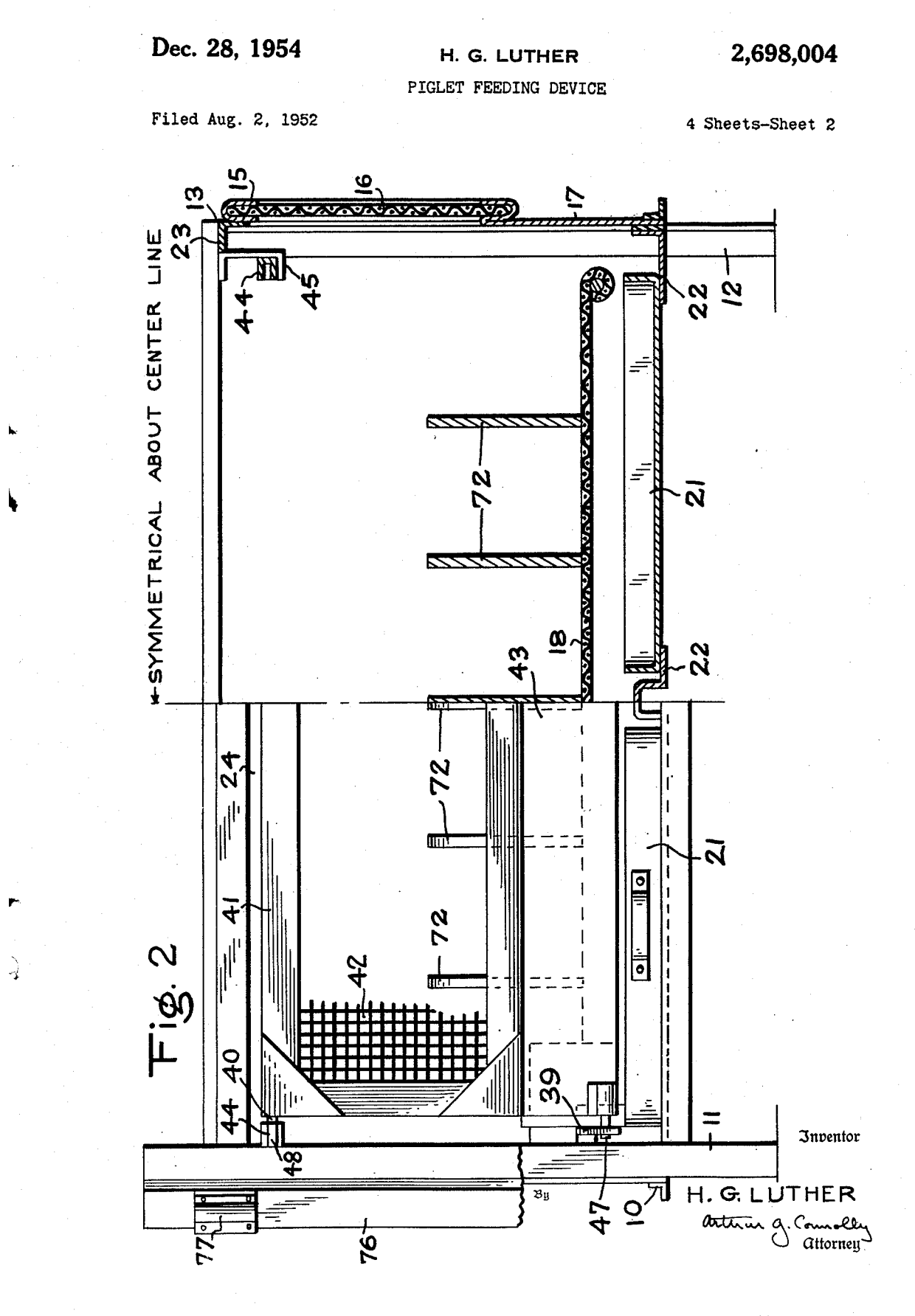

Dec. 28, 1954

H. G. LUTHER 2,698,004

PIGLET FEEDING DEVICE

Filed Aug. 2, 1952

Inventor
H. G. LUTHER
Arthur G. Connolly
Attorney

Dec. 28, 1954  H. G. LUTHER  2,698,004
PIGLET FEEDING DEVICE
Filed Aug. 2, 1952  4 Sheets-Sheet 3

Dec. 28, 1954    H. G. LUTHER    2,698,004
PIGLET FEEDING DEVICE

Filed Aug. 2, 1952    4 Sheets-Sheet 4

Inventor
H. G. LUTHER

Arthur G. Connolly
Attorney

United States Patent Office 2,698,004
Patented Dec. 28, 1954

2,698,004

PIGLET FEEDING DEVICE

Herbert G. Luther, Baldwin, N. Y., assignor to Chas. Pfizer & Co., Inc., Brooklyn, N. Y., a corporation of Delaware Application August 2, 1952, Serial No. 302,329

5 Claims. (Cl. 119—71)

The present invention relates to new and improved devices for feeding small baby pigs, or piglets.

It has recently been discovered that the mortality rate of baby pigs can be decidedly reduced by taking them away from the parent sow within a very short period following their birth, and feeding them on a synthetic milk preparation.

It has also been found that the rate of growth of small pigs can be materially increased by feeding them on the above entitled preparation away from the parent sow. This becomes of extreme importance to the farmer who naturally desires to market his pigs in as short a time as possible, so as to decrease the amount of handling necessary. Also, by means of the present invention the total amount of feed which must be fed a pig and its sow before the pig can be marketed is decreased. This is of obvious importance today with the present world shortages in grains such as corn, wheat and the like.

It is an object of the present invention to produce a piglet feeding device which is particularly adapted to receive baby pigs shortly after their birth, and to raise these pigs until they are ready to feed for themselves at a feed trough. Another object of the invention is to produce a piglet feeding device which can be used to speed up the normal growth process of baby pigs. These and other objects of the invention will be apparent from the following detailed description when considered in conjunction with the accompanying drawings, in which:

Figure 2 shows a front elevational view partly in vertical transverse section taken along line 2—2 of Figure 1;

Figure 1:
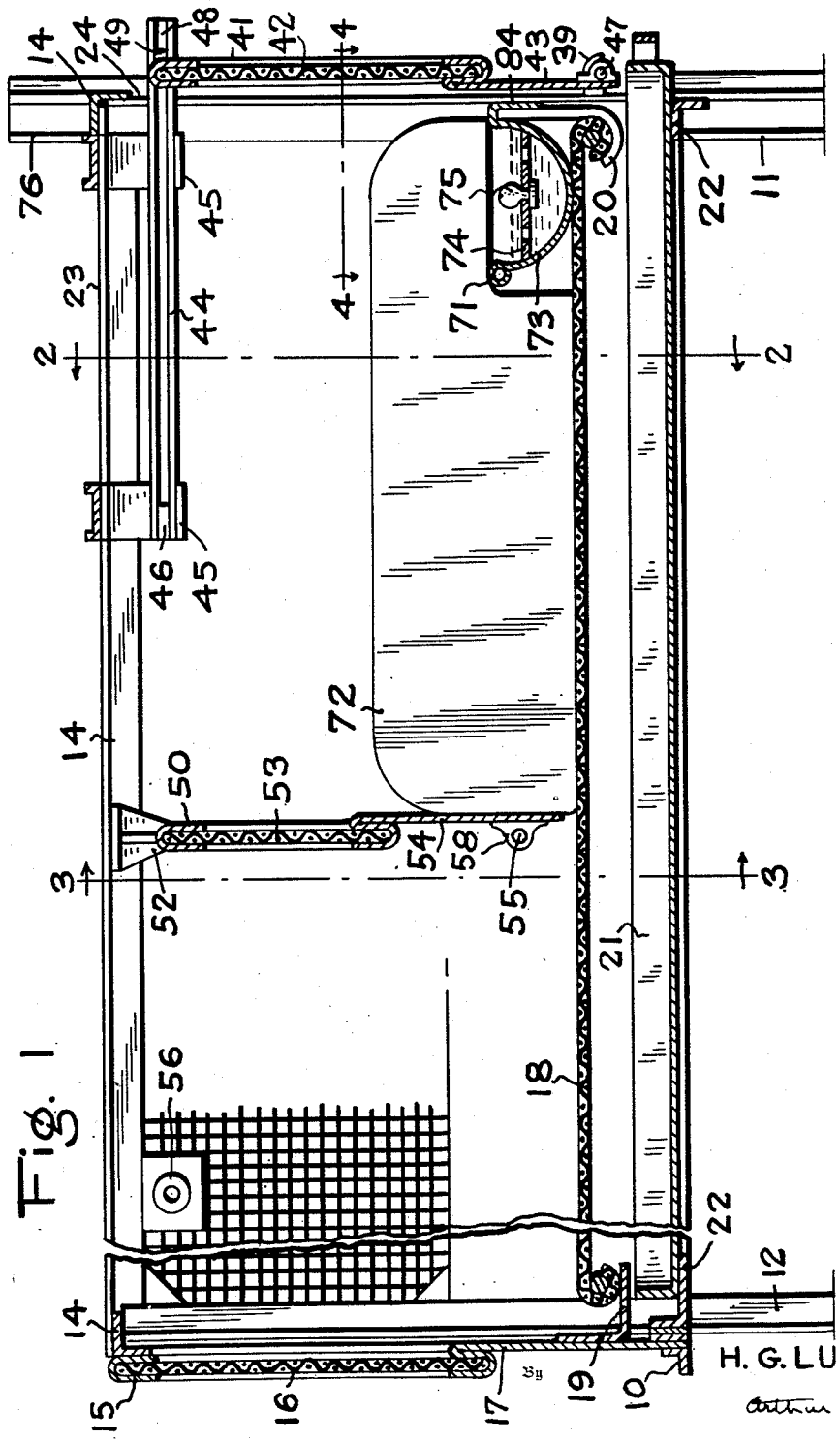
Figure 1 shows a vertical longitudinal section of a device according to this invention.
Figure 4:
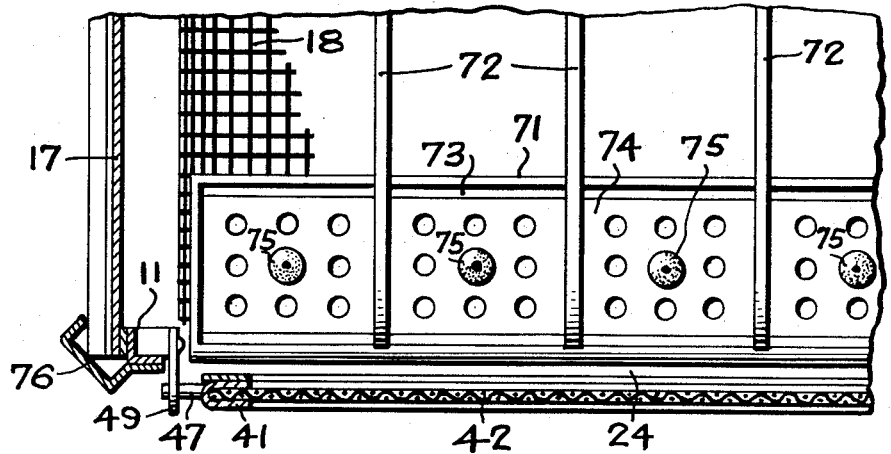
Figure 5:
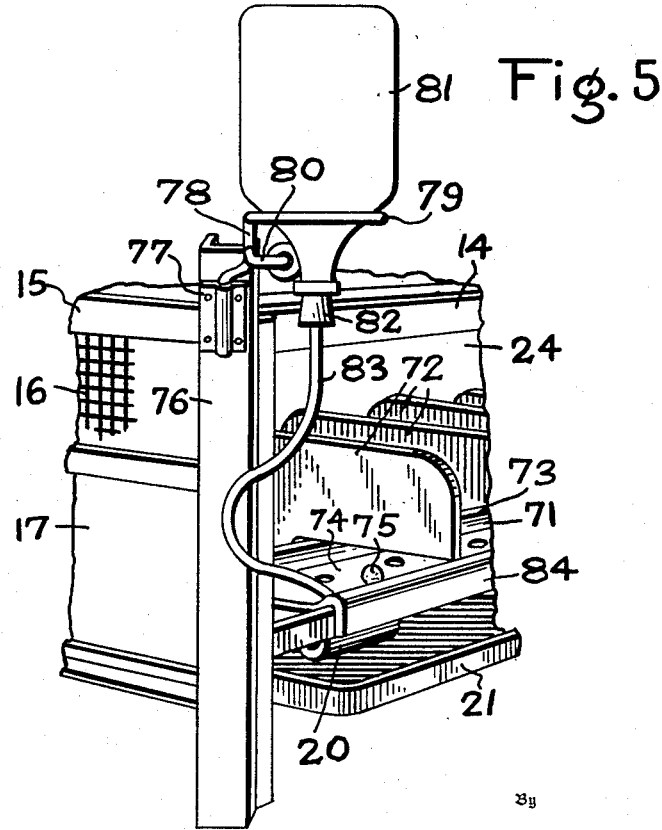

Figure 4 sets forth an enlarged vertical section of one corner of the device taken along line 4—4 of Figure 1; and Figure 5 gives a detailed perspective view of one corner of the device illustrating the manner in which a container of synthetic milk is mounted on the device for maintaining a supply of food in the feeding trough.

Referring now to the drawings it is seen that the device comprises a cage-like structure 10 placed upon two front legs 11 and two rear legs 12 which project from the floor on which the feeder rests to the top of the individual feeding section. Cross members 13 and 14 hold these legs in assembly relationship, and serve as the supports for the various other parts of the feeder, as will be shown.

The side and rear walls 15 are formed of upper sections 16 composed of coarse screen, and lower sections 17 of imperforate metal. Obviously other ventilating means besides screen wire, such as vertical rods or the like, can be used for the upper section of the device 16. The lower section 17 can be replaced with various other perforated materials so as to allow a degree of ventilation. However, the openings in this lower section should be small enough so that it is impossible for any part of a piglet's anatomy to become stuck therein.

The bottom of the feeder is composed of a screen 18 which rests at the rear of the device on supporting members 19 and at the front of the device on hook-like members 20 attached to the legs 11, as is best shown in Figure 1. It is to be understood that the perforated bottom 18 should not contain any openings which would catch any part of a pig's anatomy. A simple perforated plate may be used for this bottom, although a somewhat coarse screen is preferred for this purpose. Immediately beneath the screen 18 there are positioned two trays 21 which rest on suitable supporting members 22 arranged therefor in the structure 10. The purpose of these trays will be more fully explained later.

The top 23 of the structure 10 is most conveniently formed completely open.

The front opening 24 of the device is provided with a gate 41 formed in the same manner as are the side and rear walls of the construction with an upper screened portion 42 and a lower imperforate portion 43. The top of the gate 41 is provided with projecting pins 40, Figure 2, which fit within U-shaped channels 44 suspended from the top angle irons 14 by hangers 45. Near the rear of the channels 44 a stop element 46 is provided, so as to limit the rearward movement of the pins 40 when the front gate is disposed in an open and substantially horizontal position. The lower portion of the gate 41 is provided with corresponding projecting pins 47 adapted to slide within guide plates 39 into the open end portions 48 of the channels 44, when the gate is lifted and swung up so as to open the front 24 of the device. Stops 48 and 46 formed in the channels 44 limit the forward movement of the pins 40 and the rearward movement of the pins 40 in said channels respectively. The pins 47 are held by latch members 39 when the gate is in closed position, as is best seen in Figure 4 of the drawings.

Figure 3:
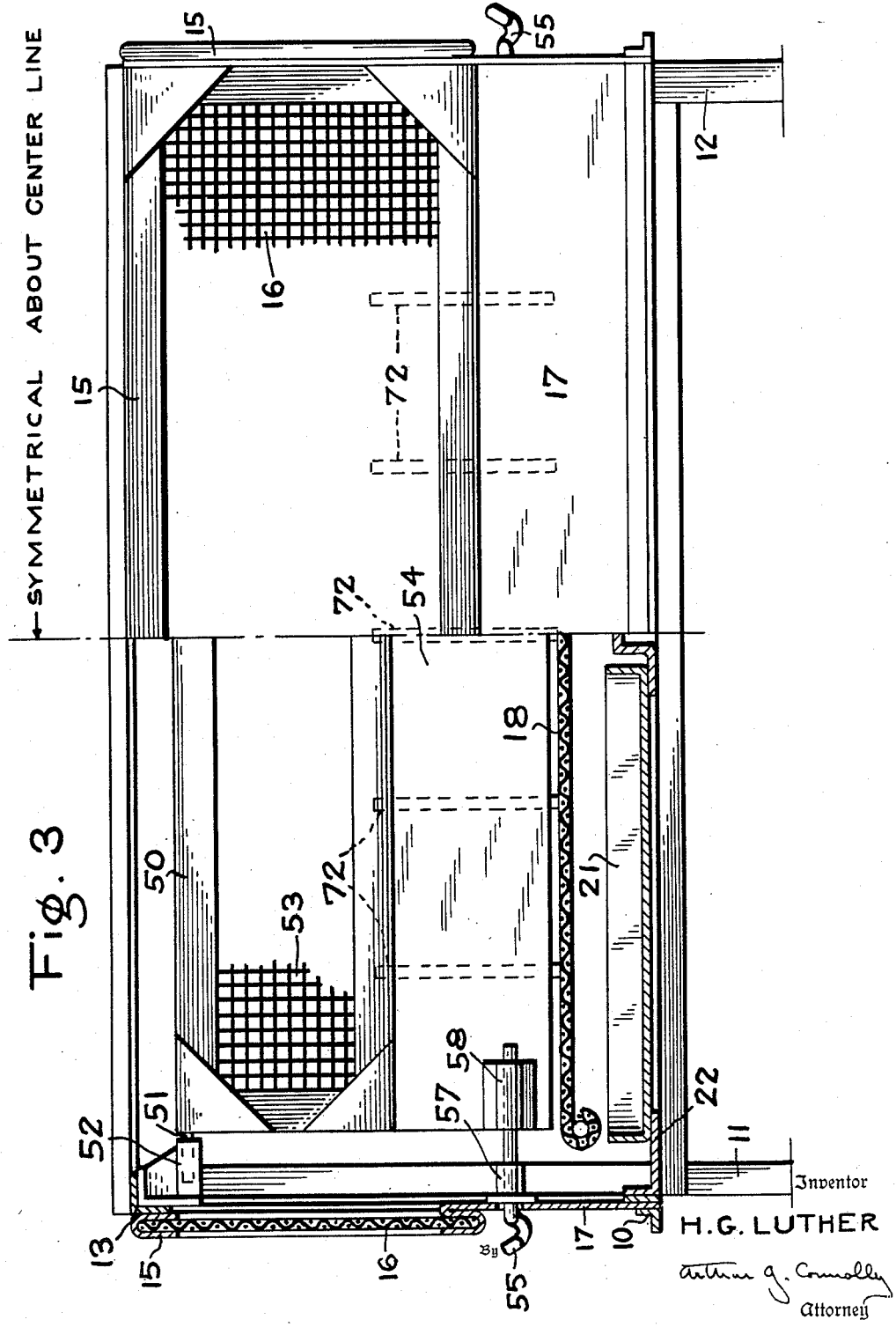
Figure 3 illustrates a rear elevational view partly in transverse vertical section taken along line 3—3 of Figure 1.

At the rear of the partitions 72 a gate 50 is fastened so as to be pivoted about points 51, formed by attaching appropriate hangers 52 to the top angle irons 14. The upper portion 53 of gate 50 is also formed of a coarse screen and the lower portion 54 is formed of a solid material. The comments above noted in respect of the formation of the side and end walls of the feeder apply to the formation of this gate. During the operation of the device the gate 50 is held in an open position along the top of the feeder by a pin 55 mounted in alined openings of a boss 56 carried by side wall 15 and a boss 58 carried by said gate. When the gate is down and in closed position, the pin 55 is disposed in alined openings of a boss 57 carried by the side wall 15 and boss 58, as shown in Figure 3.

Immediately within the front opening 24 of the feeder there is positioned the actual feeding trough construction 71 consisting of an upward shaped trough 73 and a series of partitions or dividers 72 separating the trough into a series of individual feeding compartments for pigs. Within the trough 73 there is positioned a perforated baffle plate 74 through openings in which there project upward rubber nipples 75. The front end of the trough 73 is formed in an inverted U-shaped manner at 84 so as to grasp and be hooked in position upon the upper edge portion of member 20 attached to the legs 11. All the elements of the feeder trough, including the spacer walls 72, are held in fixed relationship to one another as by welding, soldering, etc.

While many individual means may be employed to fill the trough 73 with nutrient solution, it is preferred to use an arrangement such as shown on Figure 5 of the drawings to accomplish this purpose. This arrangement consists of a separate U-shaped member 76 positioned diagonally out from the front legs 11 by means of appropriately fastened flanges. Near the upper portion of the individual feeders a bracket 77 is positioned upon the member 76. This bracket is formed so that a wire bottle holder 78 can be mounted within it and held in position. This bottle holder consists of an upper circular loop 79 and a lower handle holding wire 80, both positioned away from the member 76 by slightly more than approximately half the diameter of the common gallon jug 81. The mouth of this jug is provided with a stopper 82 and a hose 83 leading to the trough 73.

The individual piglet feeders formed in accordance with this invention are preferably stacked one upon another in the manner used to stack chicken cages, rabbit hutches, and the like. This can be done by forming the individual feeder sections so that the angle iron legs on each fit over the angle iron legs on the next lower structure. Frequently it is desirable to employ various electrical heating devices to heat either the milk in the feeding troughs or the entire feeder structure. Electrical mountings for such elements may be fastened upon the member 76 and positioned within the feeder troughs or other portions of the device in accordance with conventional known manners.

During the operation of the structure 10, the gate 41 is lifted to a substantially horizontal position and then shoved toward the rear of the device, so that the pins 47 fit within the projecting open end portions 48 of the U-shaped track 44, holding this gate open. With the gate 41 in this position piglets may be positioned within the device by merely shoving them through the front opening. Of course if only one feeder is employed instead of a stack of feeders, piglets may be inserted therein by lowering them through the open top 23 of the structure. Then milk is introduced into the trough 73 as from the bottle 81, which is positioned as indicated. The drawers 21 beneath the perforated bottom 18 are used to catch any droppings from above. For this reason they are preferably filled with sawdust, shavings, or the like, although this is not absolutely necessary.

The rear gate 50 is employed to prevent pigs from backing away from the feeding trough 73 so that they will learn to eat at a trough at an early age. This gate is not absolutely necessary with the present invention, although it frequently may assist to increase the rate of growth of the individual baby pigs by keeping their heads in proximity to the feed in trough 73.

Those skilled in the art will recognize that the herein described and disclosed invention is capable of a wide variety of modifications. Such alterations or changes are to be considered as within the scope of the present invention insofar as they are defined by the appended claims.

What is claimed is:

1. A feeding device for feeding baby pigs comprising a substantially rectangular structure having supporting legs at each corner, a perforate bottom mounted in said structure and arranged in spaced relation above the lower extremities of the legs, side and rear walls surrounding three sides of the structure, a drawer slidably mounted in the structure beneath said bottom, a movable front gate for closing the front of said structure, means for movably mounting said front gate on said structure whereby said gate can be moved from a position closing the front of the structure to a position on top of the structure whereby the front of the structure is open, a sectional feeding trough arranged across the front of the structure and positioned above said perforate bottom wall, a plurality of spacer walls arranged substantially in parallel relationship with the side walls of the structure and extending from the front of said feeding trough rearwardly toward said rear wall for providing a series of individual pig feeding pens within the structure, and a movable rear gate arranged within the structure forwardly of said rear wall for closing the rear of the feeding pens, whereby the pigs are confined individually in said feeding pens, when the front gate is positioned to close the front of the structure.

2. A piglet feeding device comprising a series of individual feeder structures as defined in claim 1 stacked one upon another.

3. A piglet feeding device as defined in claim 1, wherein means are attached for introducing a synthetic milk composition into said trough.

4. A device for feeding baby pigs with a synthetic milk composition which comprises a perforate bottom wall, at least partially perforated side and rear walls, a front wall mounted so as to be opened upwards, a feeding trough positioned immediately within said front wall, a series of vertical spacers positioned on said trough so as to form a series of individual piglet feeding compartments, a perforate baffle plate extending the length of said trough and positioned therein in a position to be at least partially submerged when the trough is filled with said composition and nipple means carried in spaced perforations of said baffle plate to project upwardly within each of said feeding compartments.

5. A device as defined in claim 4, including gate means to close off said individual piglet feeding compartments to provide a totally enclosed chamber of such small size as to force the head of the piglet to project into proximity with the nipple in said trough.

References Cited in the file of this patent

UNITED STATES PATENTS

| Number | Name | Date |
|---|---|---|
| 209,225 | Carpenter | Oct. 22, 1878 |
| 284,301 | Hester et al. | Sept. 4, 1883 |
| 394,955 | Butler | Dec. 25, 1888 |
| 729,688 | Smith et al. | June 2, 1903 |
| 1,402,739 | Clark et al. | Jan. 10, 1922 |
| 1,580,774 | Barker | Apr. 13, 1926 |
| 1,580,775 | Barker | Apr. 13, 1926 |
| 1,749,377 | Eubanks | Mar. 4, 1930 |
| 1,891,811 | Grimes | Dec. 20, 1932 |
| 2,303,615 | Cobb et al. | Dec. 1, 1942 |
| 2,311,207 | Bussey | Feb. 16, 1943 |
| 2,661,800 | Reichenbach | Dec. 8, 1953 |

FOREIGN PATENTS

| Number | Country | Date |
|---|---|---|
| 2,670 | Great Britain | 1912 |